(12) United States Patent
Schuette

(10) Patent No.: US 9,489,663 B2
(45) Date of Patent: Nov. 8, 2016

(54) KEYPAD FOR THE ENTRY OF AUTHENTICATION DATA

(71) Applicant: Mark Thomas Schuette, Wiesloch (DE)

(72) Inventor: Mark Thomas Schuette, Wiesloch (DE)

(73) Assignee: SAP, Walldorf (DE)

(*) Notice: Subject to any disclaimer, the term of this patent is extended or adjusted under 35 U.S.C. 154(b) by 178 days.

(21) Appl. No.: 14/501,041

(22) Filed: Sep. 30, 2014

(65) Prior Publication Data

US 2016/0093131 A1    Mar. 31, 2016

(51) Int. Cl.
| H04L 29/06 | (2006.01) |
| G06Q 20/10 | (2012.01) |
| G07C 9/00 | (2006.01) |
| G07F 19/00 | (2006.01) |
| G07F 7/10 | (2006.01) |

(52) U.S. Cl.
CPC ....... *G06Q 20/1085* (2013.01); *G07C 9/00674* (2013.01); *G07F 7/1033* (2013.01); *G07F 19/2055* (2013.01); *H04L 63/08* (2013.01); *H04L 63/10* (2013.01)

(58) Field of Classification Search
CPC ............................ G07C 9/00674; H04L 63/10
See application file for complete search history.

(56) References Cited

U.S. PATENT DOCUMENTS

| 6,062,474 A * | 5/2000 | Kroll ................. G06K 5/00 235/379 |
| 6,442,692 B1 | 8/2002 | Zilberman |
| 6,542,071 B1 * | 4/2003 | Ohtsubo ............. B60R 25/2036 340/10.1 |
| 2003/0172281 A1 | 9/2003 | Lee |
| 2004/0168067 A1 * | 8/2004 | Russikoff ................. G07F 7/10 713/183 |
| 2009/0039101 A1 * | 2/2009 | Alcov ................... G06Q 10/06 221/155 |
| 2010/0148997 A1 * | 6/2010 | Xu ....................... H01H 13/64 341/22 |
| 2013/0124346 A1 * | 5/2013 | Baldwin ............. G06Q 20/322 705/16 |

(Continued)

FOREIGN PATENT DOCUMENTS

| EP | 1 708 110 | 10/2006 |
| GB | 2 064 224 | 6/1981 |

OTHER PUBLICATIONS

EPO, European Search Report, EP 14187020.4, May 27, 2015.

(Continued)

*Primary Examiner* — Izunna Okeke
*Assistant Examiner* — Ali Shayanfar
(74) *Attorney, Agent, or Firm* — Richardt Patentanwalte PartG m

(57) ABSTRACT

The invention provides for an electronic system with a keypad for manual entry of authentication data by a user. The keypad comprises: multiple keys for entering the authentication data. At least one of the multiple keys comprises a three position switch with an elastic element for restoring the three position switch to a first position. The three position switch is operable to be depressed in a motion direction to a second position and a third position. The motion direction is perpendicular to a surface where the keys are mounted. A first force is required to depress the three position switch to the second position and a second force is required to depress the three position switch from the second position to the third position. The second force is greater than the first force.
The keypad further comprises a controller configured for monitoring key presses of the multiple keys and for monitoring key position data of the three position switch of each of the at least one of the multiple keys during the key presses. The controller is further configured for decoding the key presses and the key position data into the authentication data. The keypad is further configured for outputting the authentication data via a data connection.

16 Claims, 7 Drawing Sheets

(56) References Cited

U.S. PATENT DOCUMENTS

2014/0170735 A1\* 6/2014 Holmes .................. G01N 21/07
                                                    435/287.1
2014/0181958 A1\* 6/2014 Nosack .................. G06F 21/32
                                                    726/19

OTHER PUBLICATIONS

EPO, Partial European Search Report, EP 14187020.4, Apr. 8, 2015.

\* cited by examiner

KEYPAD FOR THE ENTRY OF AUTHENTICATION DATA

BACKGROUND OF THE DISCLOSURE

Field of the Disclosure

The invention relates to keypads for electronic devices.

Description of the Related Art

One of the big disadvantages of password-based logon is that the password needs to be keyed in and during this time it can be observed by a third-party or attacker (aka shoulder surfing). This has a whole history of bad experience with regards to the PIN of automated teller machines, but it is also becoming a huge problem with all mobile devices.

SUMMARY OF THE PRESENT DISCLOSURE

The invention provides for a keypad, a hardware token generator, an input device, an electronic system, and an automated teller in the independent claims. Embodiments are given in the dependent claims.

In one aspect the invention provides for a keypad for manual entry of authentication data by a user. The keypad comprises multiple keys for entering the authentication data. At least one of the multiple keys comprises a three position switch. The three position switch comprises an elastic element for restoring the three position switch to a first position when no force is applied to the three position switch. The three position switch is operable to be depressed in a motion direction to a second position. The multiple keys are mounted on a surface. That is to say the keypad comprises a surface which the multiple keys are mounted onto. The motion direction is perpendicular or mostly perpendicular to the surface. The three position switch is operably depressed in the motion direction to a third position beyond the second position. A first force is required to depress the three position switch from the first position to the second position. A second force is required to depress the three position from the second position to the third position. The second force is greater than the first force. The difference between the second force and the first force provides a tactile response to the user so the user can differentiate between the second position and the third position by feel.

The keypad further comprises a controller configured for monitoring key presses of the multiple keys and for monitoring key position data of the three position switch of each of the at least one of the multiple keys during the key presses. The controller is further configured for decoding the key presses and the key position data into the authentication data. The keypad is further configured for outputting the authentication data via a data connection. The data connection may for instance be a parallel data connection, a serial type connection, a wireless connection, a Bluetooth connection, a USB connection, or other connection along which an electronic signal or code may be sent.

This keypad may have the benefit that an operator or user is able to enter the authentication data in a manner which makes it more difficult to observe the correct key presses to enter the authentication data. For instance when a user is using the keypad one could simply look over the shoulder of the user or use a camera to record the key presses by the user. Including the one or more three position switches makes this more difficult. An adversary may be able to learn the correct sequence of key presses but it would be more difficult to know the actual distance that the key was pressed and also possibly the time or duration to go between the first and the second position of the switch and also between the second and/or third position. This may provides for a keypad for entering authentication data more securely than with a conventional keypad.

In another embodiment the difference between the second position and the third position along the motion direction is any one of the following: 0.1 mm and 0.5 mm, 0.5 and 1 mm, 1 mm and 1.5 mm, 1.5 mm and 2 mm, and greater than 2 mm. This embodiment may be beneficial because the difference in motion between the second and third position is small but the user may still be able to feel the difference with the tactile response. This may make it extremely difficult to observe the exact entry of the authentication data by a user.

In another embodiment all of the multiple keys for entering authentication data could be three position switches. Each of the multiple keys has its own three position switch. In this embodiment the controller would then monitor each of the three position switches to determine the authentication data to output.

In another embodiment the three position switch is a pushbutton switch.

The authentication data may take different forms in different examples. One example is where the key position data is mapped to specific characters or character strings. In another example the authentication data includes Meta data which is descriptive of the movement of the three position switches. Meta data might include the key position data and may also include rhythmic or timing data. It may also be possible to have information on the speed at which the switch goes between the first and second position, the second and third position, or even the first to third position be included in the authentication data.

In another embodiment the difference between the first force and the second force provides tactile feedback to the user.

In another embodiment the difference between the first force and the second force is at least 10 gram force. 1 gram force is equal to 9.80665 mN. In another embodiment the difference between the first force and the second force is between 10 and 20 gram force. In another example the difference between the first force and the second force is between 20 and 30 gram force. In another example the difference between the first force and the second force is 30 gram force. In another embodiment the difference between the first force and the second force is between 30 and 40 gram force. In another example the difference between the first force and the second force is between 40 and 50 gram force. In another example the difference between the first force and the second force is between 50 and 60 gram force. In another example the difference between the first force and the second force is between 60 and 70 gram force. In another example the difference between the first force and the second gram force is between 70 and 80 gram force. In another example the difference between the first force and the second force is between 80 and 90 gram force. In another example the difference between the first force and the second force is between 90 and 100 gram force. In another example the difference between the first force and the second gram force is between 100 and 150 gram force. In another example the difference between the first force and the second force is between 150 and 200 gram force. In another example the difference between the first force and the second force is between 200 and 250 gram force.

In another example the difference between the first force and the second force is less than any one of the following: 20, 30, 40, 50, 60, 70, 80, 90, 100, 150, 200, and 250 gram force.

In another example the first force is at least 20, 30, 40, 50, 60, 70, 80, 90, 100, 150, 200, and 250 gram force. The second force can be determined by the value of the first force and any one of the above differences between the first and second force.

In another embodiment the authentication data is a character string. Decoding the key presses and the key position data into the authentication data comprises mapping the key position data into characters in the character string. For example the keypad may be for entering digits such as a pin number. The additional data which is descriptive of the positions of the three position switch may be mapped such that additional characters or symbols are added to the authentication data. For example a letter or number code could be added to indicate the position or positions the switch was pressed to.

In another embodiment the authentication data comprises a character string representing the key presses and Meta data descriptive of the position data. For instance the data entered by the keypad can simply be described in terms of a normal pin or pass code that is entered. Additional Meta data may be then used to describe the position of the three position switches during the entry of data. This may contain such additional information as the velocity or even the time to transition between the first and second position and/or the second and third position.

In another embodiment the key position data is time-dependent. This could include how quickly the keys are pressed. It also may include data on relative velocity of a key press in comparison to other key presses. For instance this may include entering the password with a particular rhythm.

In another embodiment the authentication data is descriptive of a rhythm used to enter the authentication data.

In another embodiment the authentication data is descriptive of the duration between depressing the three position switch to the second position.

In another embodiment the authentication data is descriptive of a duration between depressing the three position switch from the first position to the third position.

In another embodiment the authentication data is descriptive of the velocity of the three position switch.

In another aspect the invention provides for a hardware token generator for generating a security token. A hardware token generator is a device or apparatus which is used to generate a code which can be used for a security protocol. Very typically hardware token generators have a clock and are used to generate a pin or other pass code which is only valid for a particular duration of time. The hardware token generator comprises a keypad according to an embodiment. The hardware token generator comprises a display for displaying the security token. The security token may be a numerical and/or character and/or symbol display. The hardware token generator further comprises a clock for generating a current time. The hardware token generator further comprises a processor configured for receiving the authentication data via data connection. The hardware token generator further comprises a memory for storing machine-executable instructions and a cryptographic key. Execution of the machine-executable instructions causes the processor to generate the security token by using the current time, the authentication data, and the cryptographic key as input to a cryptographic algorithm. Execution of the machine-executable instructions further causes the processor to display the security token on the display.

This hardware token generator may have the benefit of being able to generate the security token more securely. An observer may see the sequences of keys pressed during use of the hardware token generator but it may be more difficult for the observer or adversary to determine how hard or fast or with what rhythm the keys were pressed.

In another aspect the invention provides for an input device comprising a keypad according to an embodiment. The input device further comprises an interface for connecting the input device to an electronic system. The data connection is configured for transferring the authentication data to the interface. This embodiment may be beneficial because the input device may be used as a input device of an electronic system for enhanced secure entry of authentication data. In some cases the data connection may be the interface. In other cases the interface is a converter for the data connection. For example the interface may be an USB interface, a wire less (WIFI) interface, a Bluetooth, or other interface.

In another embodiment the input device is a keyboard.

In another embodiment the interface is any one of the following: a PS/two port connection, a USB connection, a Wi-Fi connection, a Bluetooth connection, a wireless connection, and a wired connection.

In another aspect the invention provides for an electronic system comprising the input device of any one of claim 9, 10, or 11. The electronic system comprises a memory for storing machine-executable instructions and an authentication data database. The electronic system further comprises a processor for executing the machine-executable instructions. Execution of the machine-executable instructions causes the processor to receive the authentication data via the interface. Execution of the machine-executable instructions further causes the processor to validate the authentication data using the authentication data database. Execution of the machine-executable instructions further cause the processor to grant access to the electronic system if the authentication data is validated.

In another example execution of the instructions further causes the processor to ignore a portion of the authentication data during the validation of the authentication data using the authentication data database. This embodiment may provide for enhanced security. This may be by how the electronic system processes the password. For example a user could routinely enter several different dummy characters during entry of the authentication data. This would make the entry of the authentication data seem random or changing aspects to it which may make it more difficult for the observer to copy the authentication data.

In another embodiment the portion of the authentication data is determined by using a predetermined motion or locations in the authentication data.

In another embodiment the portion of the authentication data is determined by determining a start of the portion by identifying an incorrect key press and determining an end of the portion by determining a correct key press. For instance the user could start to enter the authentication data and then at some point decides to enter incorrect data. The user then just simply enters as much incorrect data as is wished and then begins to type the correct end of the password. The system automatically removes the incorrect portion. This may provide for a flexible means of obfuscating the password or PIN number.

In another aspect the invention provides for an automated teller machine comprising a display. The automated teller machine further comprises a keypad according to an embodiment. The automated teller machine further comprises a processor configured for receiving the authentication data via the data connection. The automated teller machine further comprises a memory for storing machine-executable instructions. Execution of the machine-executable instructions causes the processor to display a request for a personal identification number on the display, receive the authentication data. Execution of the machine-executable instructions further causes the processor to validate the authentication data via a remote server. Execution of the instructions further causes the processor to provide account access if the authentication data is validated.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent. Not all elements shown in one figure may be shown in subsequent figures.

Figure 1:
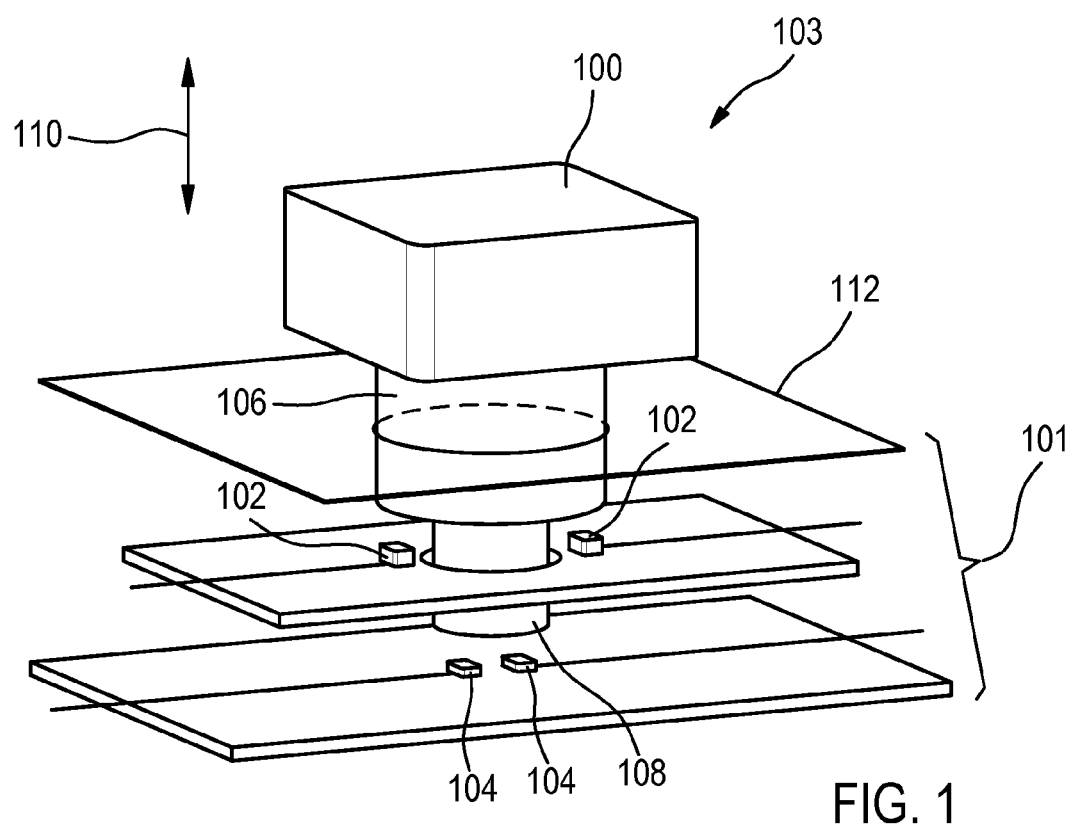
FIG. 1 illustrates a three position switch in the first position.
Figure 2:
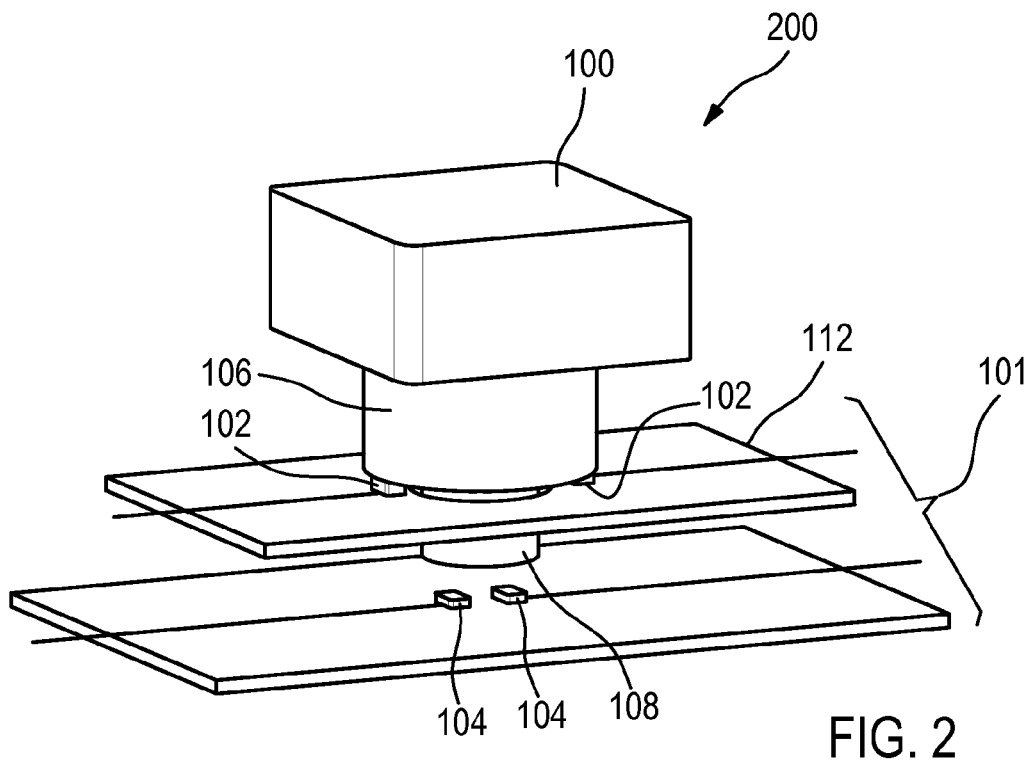
FIG. 2 illustrates the three position switch of FIG. 1 in the second position.
Figure 3:
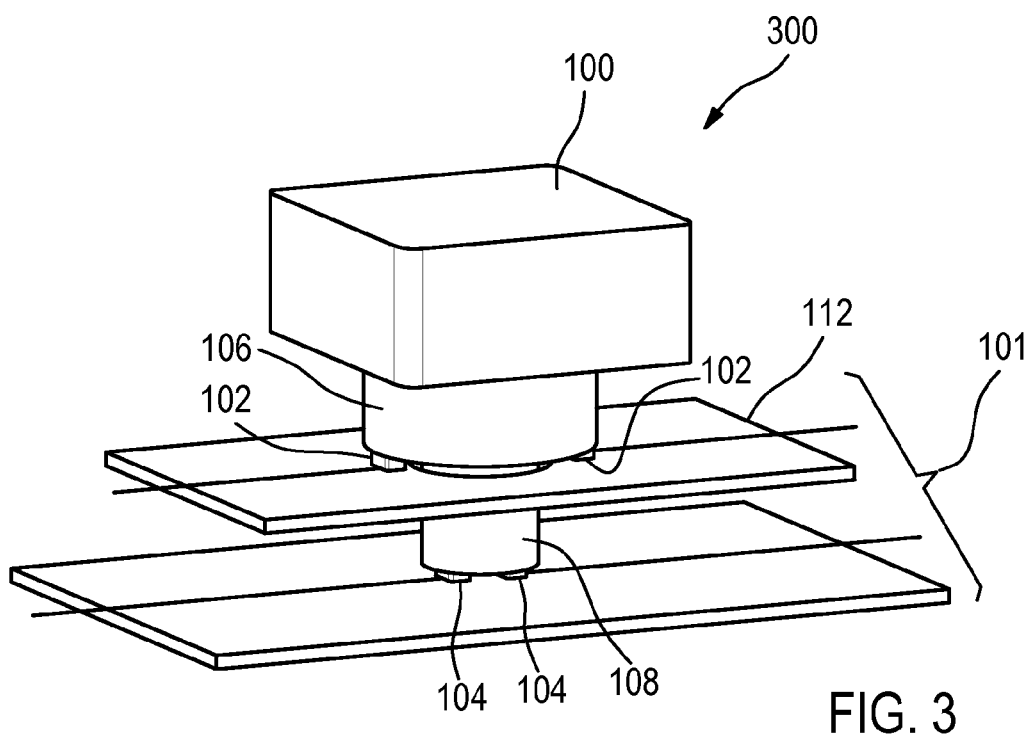
FIG. 3 illustrates the three position switch of FIG. 1 in the third position.

FIGS. 1, 2 and 3 show an example of a key 100 with a three position switch 101 for entering authentication data. FIG. 1 shows the key 100 in the first position 103. FIG. 2 shows the key 100 in the second position 200. FIG. 3 shows the key 100 in the third position 300.

The key 100 has a set of first contacts 102 that are connected when the key 100 is in the second position 200 and a second set of contacts 104 that are brought into electrical contact when the key 100 is in the third position 300. In this example when the key 100 is in the third position 300 both the first set of contacts 102 and the second set of contacts 104 are closed.

The key 100 for example may have a surface 112 which belongs to the keypad. The key 100 may then be moved in a motion direction 110 which is roughly perpendicular to the surface 112. The surface 112 is not shown in FIGS. 2 and 3.

The key 100 has a first connecting element 106 which may be used to connect the first set of contacts 102. The key 100 may have a second connecting element 108 which is used to connect the second set of electrical contacts 104. It can be seen that the first connecting element 106 is compressed or depressed when the key 100 is moved from the first 102 to the second position 200. It is also apparent from FIGS. 2 and 3 that as the key 100 is further depressed from the second position 200 to the third position 300 the first connecting element 106 is further compressed. There may be a spring or several springs within the key 100 which are used to provide the first force and the second force when the user presses the key 100 into the second position 200 it then requires additional force to press the key 100 into the third position. This may provide a tactile response to the user.

Figure 4:
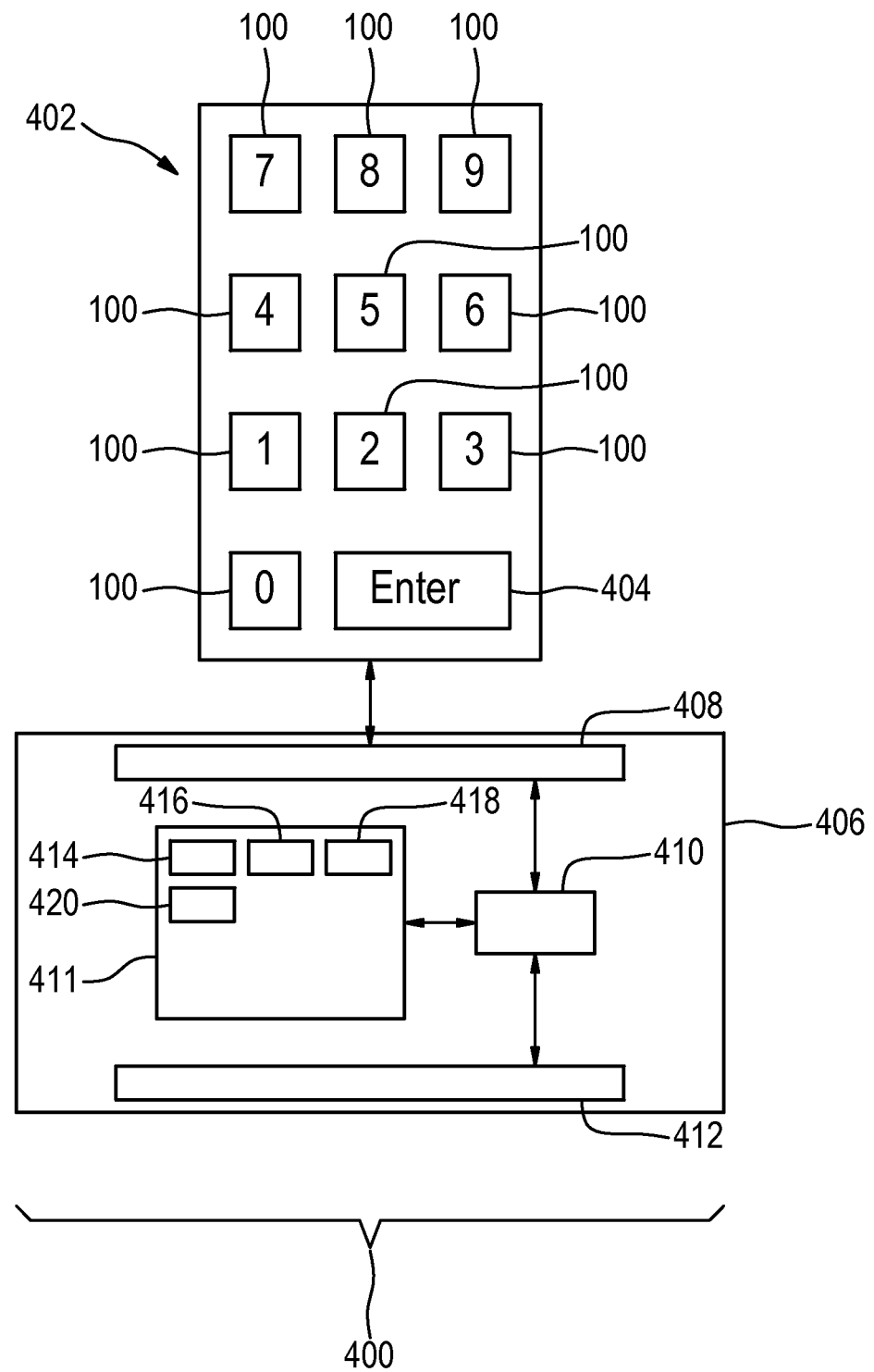
FIG. 4 illustrates an example of a keypad.

FIG. 4 shows an example of a keypad 400. The keypad has multiple keys 402. There are numeric keys 100 which are made with three position switches. The three position switch mechanisms are not shown in this figure. This particular keypad 400 also has an enter key 404 which is a normal key. However, in some examples the enter 404 or even additional keys could also be three position switches. The keys 402 are connected to a controller 406 via a connection to the multiple keys 408. The controller 406 comprises a processor unit 410 which is in connection with a data connection 412 and a memory 411. The processor 410 receives key presses 416 and key position data 418 from the multiple keys 402 via the connection to the multiple keys 408. The processor unit 410 may for instance temporarily store the key presses 416 and the key position data 418 in the memory 411. A set of instructions 414 or a program may be executed by the processor 410 which enables it to generate the authentication data 420 using the key presses 416 and the key position data 418. The authentication data 420 may take different forms. For instance it may be simply a set of characters that were generated using the key presses 416 and by mapping the key position data 418. In other examples the authentication data 420 may contain the key presses 416 and Meta data which is descriptive of the key position data 418.

Figure 5:
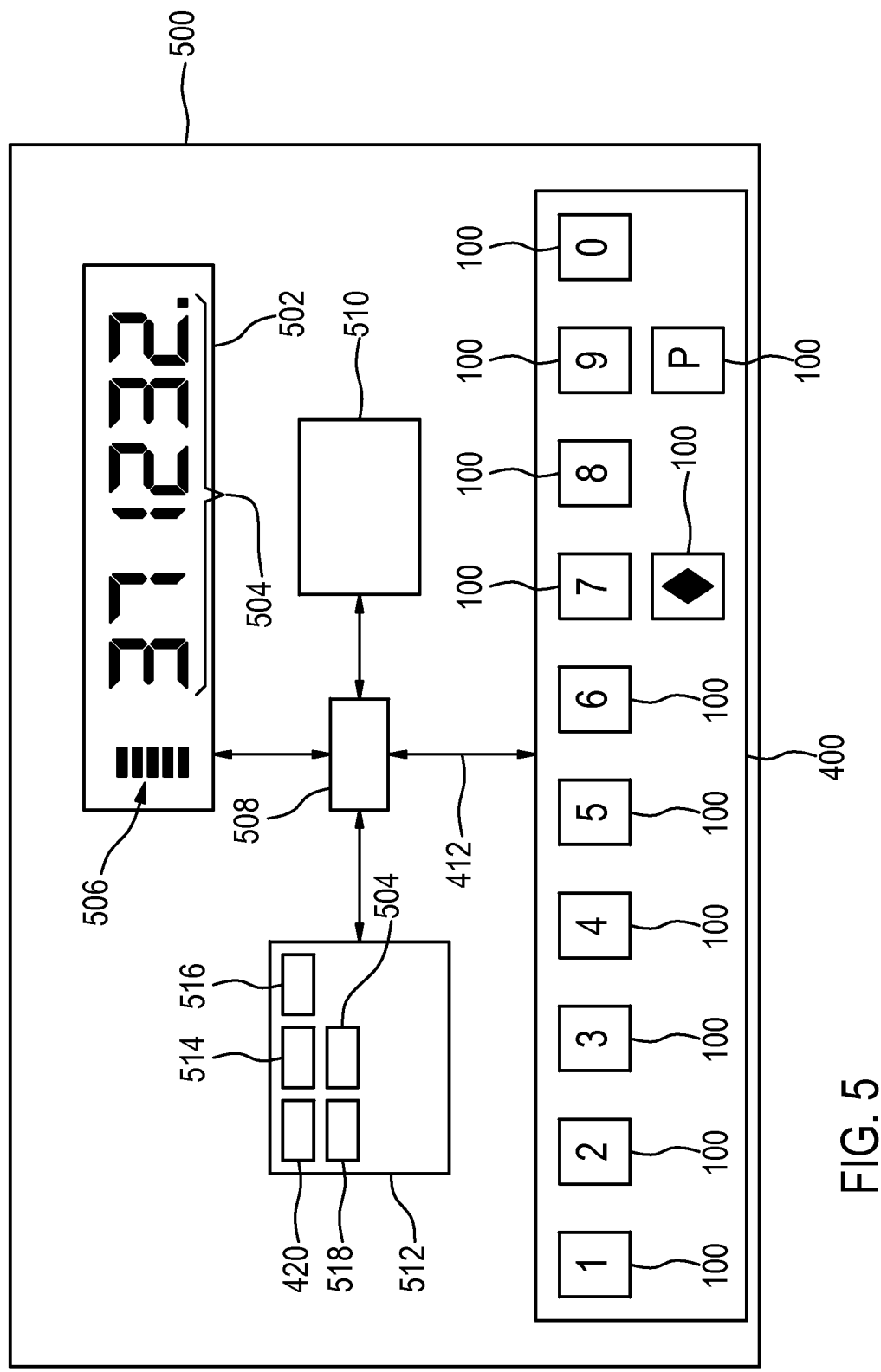
FIG. 5 illustrates an example of a hardware security token.

FIG. 5 shows an example of a hardware token generator 500. The hardware token generator 500 comprises a keypad 400. The keypad 400 has a number of keys 100 with three-position switches. All of the keys 100 in this example are shown as being three-position switches. The three position switches are not shown in this figure. However, one or more of the keys labeled 100 may also be normal switches. The hardware security token 500 further comprises a display 502 for displaying a security token 504. In this example the security token 504 is a six digit number or numeral which may be used to verify the identity of a user. Also in this example there is a time bar 506 which shows the remaining time for which the security token 504 is valid. The hardware security token 500 further shows a processor 508 that is connected to the keypad 400 via a data connection 412. The processor 508 is further shown as being connected to the display, a clock 510 and a memory 512. In some examples the processor 508 may be identical with the processor 410 shown in FIG. 4. That is to say the processor 508 may incorporate the features of processor 410 in FIG. 4. The memory 512 may have a current time 514 that has been received from the clock 510. The memory 512 may have authentication data which is received via the data connection 412. The memory 512 is further shown as containing a cryptographic key 516. The cryptographic key may be used as input with the authentication data 420 and the current time 514 as input to a cryptographic algorithm 518. The cryptographic algorithm 518 is shown as being stored in the memory 512. The output of the cryptographic algorithm 518 is then the security token 504. The security token 504 is also shown as being stored in the memory 512. When the time bar 506 indicates that the security token 504 has expired then the processor 508 may obtain a new time 510 and new authentication data 420 to go through and repeat the process of generating the security token 504.

Figure 6:
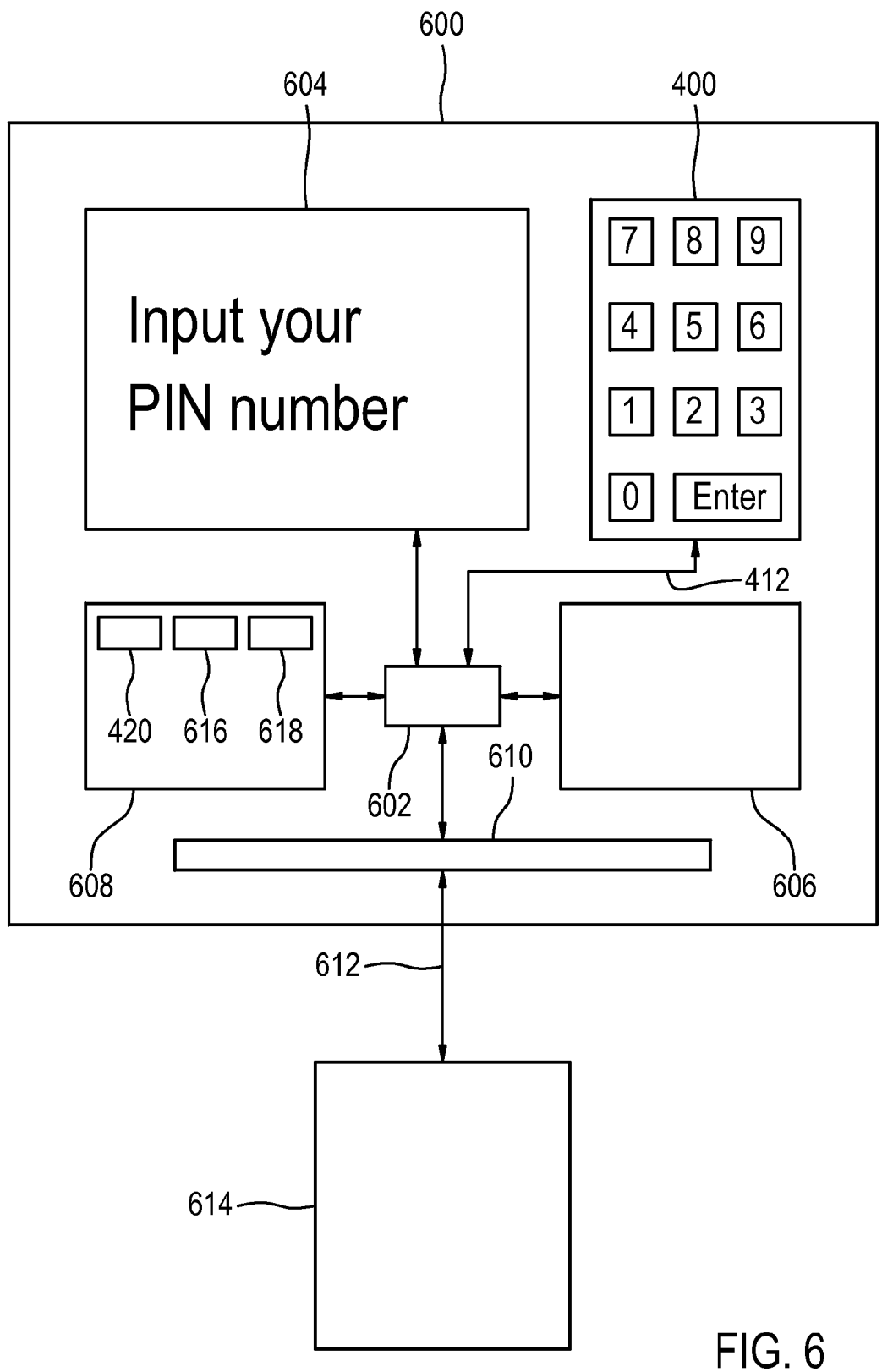
FIG. 6 illustrates an example of an automatic teller machine.

FIG. 6 shows an example of an automated teller machine 600. The automated teller machine 600 comprises a processor 602 that is in communication with a keypad 400 via a data connection 412. The processor 602 is also in contact or communication with a display 604, a money dispenser 606, a memory 608, and a network interface 610. The network interface 610 is used to establish a network connection 612 with a server 614. The memory 608 is shown as containing authentication data 420 that was received from the keypad 400 via the data connection 412. The memory 608 is also shown as containing a control module 616 that contains machine-executable instructions for execution by the processor 602. The control module 616 contains instructions which enable the processor 602 to control the operation and function of the automated teller machine 600. The memory 608 is also shown as containing a request 618. The request 618 was entered into the automated teller machine 600 by the same user as who entered the authentication data 420. The processor 602 could then execute the control module 616 and control the network interface 610 to send a request to the server 614 that comprises the authentication data 420 and the request 618. The server 614 would then validate if the authentication data 420 is correct and if the request 618 is allowed. If the request 618 is allowed by the server 614 the server 614 sends a message back to the processor 602 and then the processor 602 is then able to execute the request 618. This for instance may result in the cash dispenser 606 in dispensing cash or money.

Figure 7:
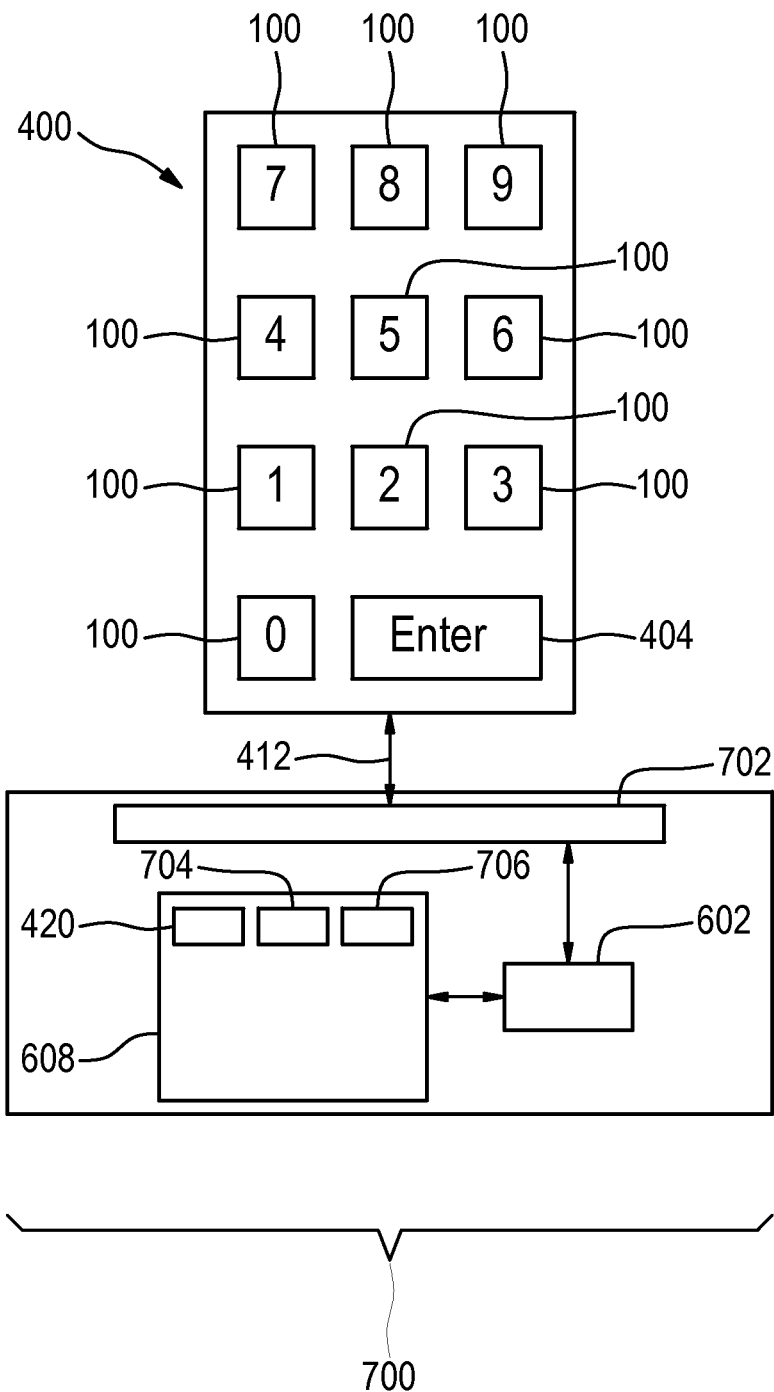
FIG. 7 illustrates an example of an electronic device.

FIG. 7 shows an example of an electronic system 700. The electronic system 700 comprises a keypad 400. The electronic system further comprises a processor 602 connected to a hardware interface 702 and a memory 608. The hardware interface 702 is connected to the interface 412 of the keypad 400. The memory 608 is shown as containing authentication data 420 received via the interface 412. The memory 608 is further shown as containing a control module 704. The control module 704 contains instructions which enable the processor 602 to control the operation and function of the electronic device 700. The memory 608 is further shown as containing an authentication database 706. When the processor 602 receives the authentication data 420, the processor 602 can validate the authentication data 420 using the authentication database 706. The control module 704 may contain instructions which enable the processor 602 to do that. If the processor 602 validates the authentication data 420 using the authentication database 706 then execution of the instructions 704 may cause the processor to grant access to the electronic system.

A shoulder-surfer can only observe what they can see with their eyes, which is the sequence of characters, numbers, special characters etc. What they cannot see is all the Meta information like touch pressure, rhythm of entering (limited), variable parts of a password etc.

By implementing a Meta information channel into password-based logon, the security posture can be significantly improved.

EXAMPLE 1

ATM

When withdrawing money from an ATM, you typically have to enter a 4- or 5-digit PIN. There have been numerous cases in the past where an attacker has simply observed his/her victim entering the PIN and then made a copy of the card and stole money from them. For the bank customer this often ends in a disaster as the bank's standpoint is that they must have shared their PIN or wrote it down somewhere.

By adding meta data to the PIN entering procedure, the attacker's life can be made much harder.

1.1 Pressure Sensitive Keyboard (with Two Distinct Pressure Points)

The pressure sensitive keyboard would have two pressure points (i.e. press lightly and hard) like with the shutter of a DSLR camera. The bank would have to tell the customer which digits of the PIN are to be pressed lightly (i.e. beyond the 1st pressure point) and which ones are to be pressed harder (i.e. beyond the 2nd pressure point). The two pressure points will give the user the necessary feedback that enough pressure has been applied. Especially with an ATM there is no way of having a training program or similar. A "hard" refers to manipulating the switch to the third position. "Soft" refers to manipulating the switch to the second position.

As an attacker, simply observing the sequence of numbers is now no longer enough. Adding the hard and soft positions expands the number of passwords or PIN numbers by a factor of 16 for a 4 digit password or PIN number. This is illustrated below.

Pressure combination 1:
1st digit Hard
2nd digit Hard
3rd digit Hard
4th digit Hard
Pressure combination 2:
1st digit Hard
2nd digit Hard
3rd digit Hard
4th digit Soft
Pressure combination 3:
1st digit Hard
2nd digit Hard
3rd digit Soft
4th digit Hard
Pressure combination 4:
1st digit Hard
2nd digit Hard
3rd digit Soft
4th digit Soft
Pressure combination 5:
1st digit Hard
2nd digit Soft
3rd digit Hard
4th digit Hard
Pressure combination 6:
1st digit Hard
2nd digit Soft
3rd digit Hard
4th digit Soft
Pressure combination 7:
1st digit Hard
2nd digit Soft
3rd digit Soft
4th digit Hard
Pressure combination 8:
1st digit Hard
2nd digit Soft
3rd digit Soft
4th digit Soft
Pressure combination 9:
1st digit Soft
2nd digit Hard
3rd digit Hard
4th digit Hard
Pressure combination 10:
1st digit Soft
2nd digit Hard 3rd digit Hard
4th digit Soft
Pressure combination 11:
1st digit Soft
2nd digit Hard
3rd digit Soft
4th digit Hard
Pressure combination 12:
1st digit Soft
2nd digit Hard
3rd digit Soft
4th digit Soft
Pressure combination 13:
1st digit Soft
2nd digit Soft
3rd digit Hard
4th digit Hard
Pressure combination 14:
1st digit Soft
2nd digit Soft
3rd digit Hard
4th digit Soft
Pressure combination 15:
1st digit Soft
2nd digit Soft
3rd digit Soft
4th digit Hard
Pressure combination 16:
1st digit Soft
2nd digit Soft
3rd digit Soft
4th digit Soft The pressure points would have to be distinct enough to not add too much pressure by coincidence and not too hard to press to not reveal the pressure level (soft or hard) visually (for the attacker).

The keypad would have to transmit in addition to the digits of the entered PIN the pressure information (soft/hard) to the backend system. The transmission would be secured in the same way as before, just adding the meta information to it.

1.2 Rhythm as Meta Information

In this case the meta information would come from pauses between entering the different digits of the PIN. For example, the PIN would require having a pause of more than 1 second between the 2nd and 3rd digit.

In this case the backend system would have to start a timer after the 2nd digit of the PIN has been received. If the 3rd digit arrives before pre-defined time is over, the PIN will be rejected eventually.

2. Mobile Devices 2.1 Rhythm

As outlined above, the user would be able to define rhythm characteristics with their passwords. For example a wait time between two characters or the rhythm of his/her favorite tune. Also here, the device would have to offer a training mode for the end user to practice.

2.2 Flexible Parts in Passwords

Traditional passwords are set with the backend once according to a password policy and then used—as they are—multiple times. A flexible-part password, in contrast, has 3 different parts.

Part 1: Fixed

Part 1 of the password is a fixed sequence of characters according to the password policy Part 2: Variable (Meta Information)

Part 2 of the password is a sequence of placeholders that are filled at password-based logon with the restriction that the same sequence of variable characters is not repeated (e.g. with a period of 10 which means after ten logon procedures you can use the first sequence again).

Part 3: Fixed

Part 3 is again a fixed sequence like part 1.

Example

A1b2C3_ _ _D4e5F6

During password-based logon the user would type in the first part of the password (i.e. A1b2C3), then type in 3 arbitrary characters (e.g. $tU), then continue with the 3rd part of the password (i.e. D4e5F6).

The backend would then check if the first part is o.k., the second part hasn't been used before (inside the pre-defined period of e.g. 10 times), and the 3rd part is o.k.

The attacker would observe the password entered and try to logon but would fail due to the fact that the second part is re-used and rejected.

At the next logon the legitimate user would get a notification that an already expired password has been used which might give a hint that his/her account has been attacked and has a chance to change the password overall.

Example

Password: fixed

A1b2C3D4e5

Flexible sequence: 3 characters, initiated by the @ symbol

At logon:

A1b2C@abc3D4e5

Obfuscating the password:

You start typing your password, then deliberately type something wrong (bogus characters) and then continue with the real password.

For example if the password were A1b2C3D4e5, an accepted password would be A1b2ZZUZC3D4e5. Another accepted password would be: HENKJA1b2C3D4e5. The manipulation of the three way switches could also be included into this scheme. A character in the password is not considered correct unless it is correctly pressed into the second or third position using the three way switch.

2.3 Flexible Parts Passwords Including Rhythm

This is a combination of flexible part passwords together with rhythm meta data.

Again the password consists of three parts, part 1 fixed, part 2 flexible, and part 3 fixed again.

During password-based logon, the user would enter part 1 (rhythm doesn't matter here), the enter a number of arbitrary characters but in a certain rhythm that has been negotiated with the backend (e.g. his/her favorite tune), then continue with part 3 of the password. Here it can be defined if the variable part should be reusable or not.

The attacker would still be able to observe the password and to re-type it but due to the fact that he isn't able to reproduce the rhythm metadata he's bound to fail.

The advantage of this method is that the passwords get a lot more complex from an attackers point of view but are still easy to remember from a user's point of view as the user just needs to memorize the 1st and 3rd part of the password.

A backend system would have a configuration utility wherein the administrator can define the positions of flexible characters in the overall password by policy.

Also here, a training program would be offered by the mobile device operating system.

Figure 8:
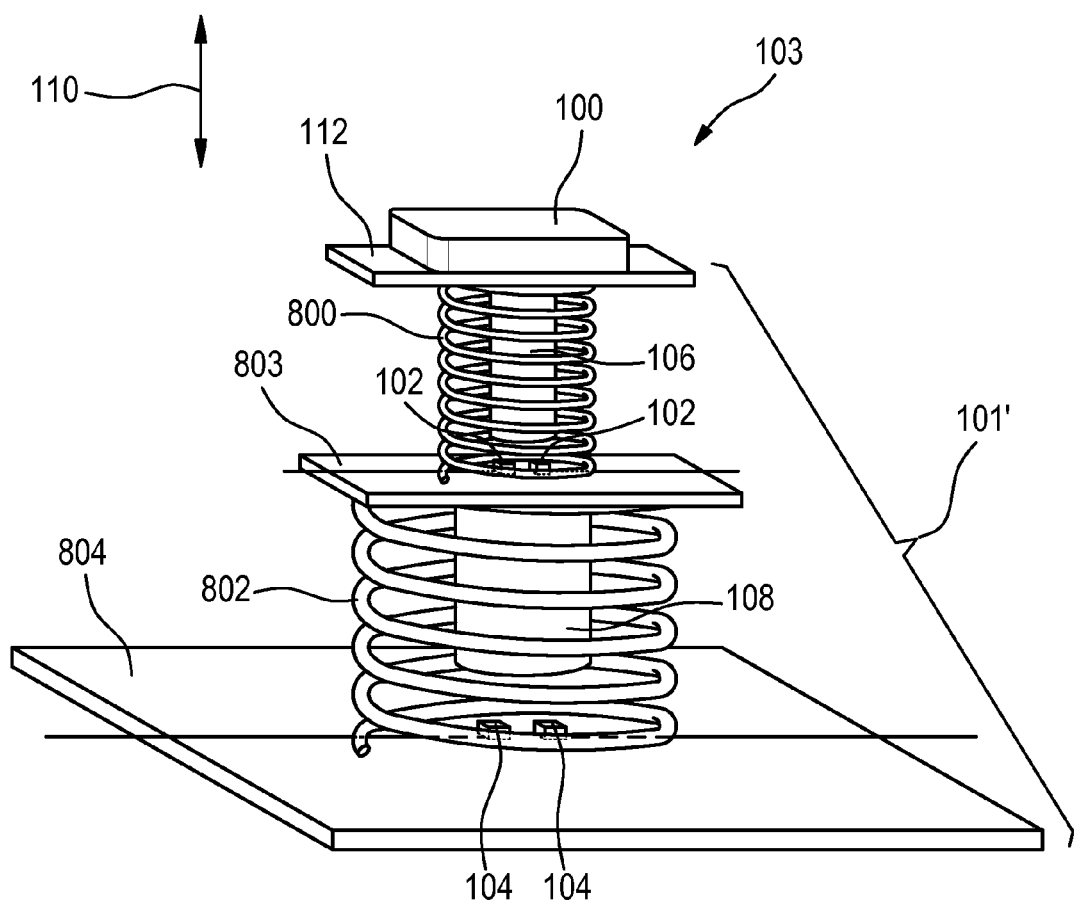
FIG. 8 illustrates a further example of a key with a three position switch.

FIG. 8 shows a further example of a key with a three position switch 100'. The switch 100' is similar to the switch 100 shown in FIGS. 1 through 3. In this example, there is a first spring 800 and a second spring 802. The first spring is between the key 100 and the structure 803 with the first set of contacts 102. The second spring is between the structure 803 with the first set of contacts 102 and the structure 804 with the second set of contacts 104. The first spring 800 is weaker than the second spring 802, it requires less force to compress it than the first spring.

When the key is depressed, the first spring 800 compresses much more than the second spring and the first connecting element contacts the first set of contacts. This places the three position switch 100' into the second position. If the force on the key 100 is increased further then the first connecting element 106 puts force onto the structure 803 with the first set of contacts. The second spring 802 may then be compressed bringing the second connecting element into contact with the second set of contacts 104. In this example the surface 112, the structure 803 with the first set of contacts 102, and the structure 804 with the second set of contacts 104 may be able to move relative to each other in the direction 110. This is however only an example and in other examples, these structures may be fixed relative to each other.

LIST OF REFERENCE NUMERALS 100 key
101 three position switch
101' three position switch
102 first set of contacts
103 first position
104 second set of contacts
106 first connecting element
108 second connecting element
110 motion direction
112 surface
200 second position
300 third position
400 keypad
402 multiple keys
404 enter key
406 controller
408 connection to multiple keys
410 processor unit
411 memory
412 data connection
414 instructions
416 key presses
418 key position data
420 authentication data
500 hardware token generator
502 display
504 security token
506 time bar
508 processor
510 clock
512 memory
514 current time
516 cryptographic key
518 cryptographic algorithm
600 automated teller machine
602 processor
604 display
606 cash dispenser
608 memory
610 network interface
612 network connection
614 server
616 control module
618 request
700 electronic system
702 hardware interface
704 control module
706 authentication database
800 first spring
802 second spring
803 structure
804 structure

The invention claimed is:

1. An electronic system comprising:
an input device, wherein the input device comprises a keypad for manual entry of authentication data by a user, wherein the keypad comprises:
multiple keys for entering the authentication data, wherein at least one of the multiple keys comprises a three position switch, wherein the three position switch comprises an elastic element for restoring the three position switch to a first position when no force is applied to the three position switch, wherein the three position switch is operable to be depressed in a motion direction to a second position, wherein the multiple keys are mounted on a surface, wherein the motion direction is perpendicular to the surface, wherein the three position switch is operable to be depressed in the motion direction to a third position beyond the second position, wherein a first force is required to depress the three position switch to the second position, wherein a second force is required to depress the three position switch from the second position to the third position, wherein the second force is greater than the first force; and
a controller configured for monitoring key presses of the multiple keys and for monitoring key position data of the three position switch of each of the at least one of the multiple keys during the key presses, wherein the controller is further configured for decoding the key presses and the key position data into the authentication data, wherein the keypad is further configured for outputting the authentication data via a data connection;
a memory for storing machine executable instructions and an authentication data database; and
a processor for executing the machine executable instructions, wherein execution of the machine executable instructions causes the processor to:
receive the authentication data via the interface;
validate the authentication data using the authentication data database;
grant access to the electronic system if the authentication data is validated; and
ignore a portion of the authentication data during the validation of the authentication data using the authentication data database.

2. The electronic system of claim 1, wherein the difference between the first force and the second force provides tactile feedback to the user.

3. The electronic system of claim 1, wherein the difference between the first force and the second force is at least 10 gram force.

4. The electronic system of claim 1, wherein the authentication data is a character string, wherein decoding the key presses and the key position data into the authentication data comprises mapping the key position data into characters in the character string.

5. The electronic system of claim 1, wherein the authentication data comprises a character string representing the key presses and metadata descriptive of the key position data.

6. The electronic system of claim 1, wherein the key presses is time dependent.

7. The electronic system of claim 1, wherein the key position data is time dependent.

8. The electronic system of claim 1, wherein the authentication data is descriptive the velocity of the three position switch.

9. The electronic system of claim 1, wherein the authentication data is descriptive of a rhythm used to enter the authentication data.

10. The electronic system of claim 1, wherein the authentication data is descriptive of a duration between depressing the three position switch to the second position and the third position.

11. The electronic system of claim 1, wherein the electronic system is a hardware token generator for generating a security token, wherein the electronic system further comprises:
a display for displaying the security token;
a clock for generating a current time;
a processor configured for receiving the authentication data via a data connection; and
a memory for storing machine executable instructions and a cryptographic key, wherein execution of the machine executable instructions causes the processor to:
generate the security token by using the current time, the authentication data, and the cryptographic key as input to a cryptographic algorithm, and
display the security token on the display.

12. The electronic system of claim 1, wherein the input device further comprises an interface for connecting the input device to the electronic system, wherein the data connection is configured for transferring the authentication data to the interface.

13. The electronic device of claim 12, wherein the interface is any one of the following: a PS/2 port connection, a USB connection, a WIFI connection, a Bluetooth connection, a wireless connection, and a wired connection.

14. The electronic system of claim 1, wherein the input device is a keyboard.

15. The electronic system of claim 1, wherein the portion of the authentication data is determined by any one of the following: using a predetermined location or locations in the authentication data, and determining a start of the portion by identifying an incorrect key press and determining an end of the portion by determining a correct key press.

16. An automated teller machine comprising:
a display;
a keypad for manual entry of authentication data by a user, wherein the keypad comprises multiple keys for entering the authentication data, wherein at least one of the multiple keys comprises a three position switch, wherein the three position switch comprises an elastic element for restoring the three position switch to a first position when no force is applied to the three position switch, wherein the three position switch is operable to be depressed in a motion direction to a second position, wherein the multiple keys are mounted on a surface, wherein the motion direction is perpendicular to the surface, wherein the three position switch is operable to be depressed in the motion direction to a third position beyond the second position, wherein a first force is required to depress the three position switch to the second position, wherein a second force is required to depress the three position switch from the second position to the third position, wherein the second force is greater than the first force, wherein the keypad further comprises a controller configured for monitoring key presses of the multiple keys and for monitoring key position data of the three position switch of each of the at least one of the multiple keys during the key presses, wherein the controller is further configured for decoding the key presses and the key position data into the authentication data, wherein the keypad is further configured for outputting the authentication data via a data connection;
a processor configured for receiving the authentication data via a data connection; and
a memory for storing machine executable instructions, wherein execution of the machine executable instructions causes the processor to:
display a request for a personal identification number on the display;
receive the authentication data via the data connection in response to displaying the request for the personal identification number;
validate the authentication data via a remote server;
provide account access if the authentication data is validated; and
ignore a portion of the authentication data during the validation of the authentication data using the authentication data database.

* * * * *